United States Statutory Invention Registration [19]

[11] Reg. Number: H900

Griffin [43] Published: Mar. 5, 1991

[54] MAGNETIC REPULSION SUPPORTED RING

[75] Inventor: Joseph T. Griffin, Fairborn, Ohio

[73] Assignee: The United States of America as represented by the Secretary of the Air Force, Washington, D.C.

[21] Appl. No.: 215,689

[22] Filed: Jul. 6, 1988

[51] Int. Cl.[5] ..... H02K 1/12

[52] U.S. Cl. ..... 505/1; 310/40 R; 310/254; 310/261; 505/877

[58] Field of Search ..... 310/254, 10, 40 R, 52, 310/61, 93, 105, 106, 90.5, 261, 258

[56] References Cited

U.S. PATENT DOCUMENTS

| | | | |
|---|---|---|---|
| 2,679,604 | 5/1954 | Jaeschke | 310/93 |
| 3,026,151 | 3/1963 | Buchhold | 310/90.5 |
| 3,175,405 | 3/1965 | Doyle | 310/90.5 |
| 3,261,210 | 7/1966 | Buchhold | 310/90.5 |
| 4,037,123 | 7/1977 | Mole | 310/52 |
| 4,042,846 | 8/1977 | Sterrett | 310/52 |
| 4,398,111 | 8/1983 | Zuch | 310/93 |
| 4,476,410 | 10/1984 | Wolcott | 310/228 |
| 4,797,386 | 1/1989 | Gyorgy et al. | 335/216 |

OTHER PUBLICATIONS

High-Temperature Superconductors II; D. W. Capone, II; 04/5-9/88; Reno, Nev.; pp. 147-149.

"A Magnetic Bearing Based on Eddy-Current Repulsion", J. L. Nikolajsen, Texas A3M Univ. (1985).

*Primary Examiner*—Linda J. Wallace
*Attorney, Agent, or Firm*—Donald J. Singer

[57] ABSTRACT

Magnetic support structure for a rotatable machinery part is described which comprises a stationary support structure, an annular stator comprising an array of a plurality of electromagnets or one or more electrically conductive or superconductive elements supported by the support structure about an axis, rim structure attached to the periphery of the rotatable part for rotation therewith about the axis radially inwardly of and proximate to the electromagnets, the rim structure including electrically conductive non-ferromagnetic material for magnetic interaction with the stator, and a source of power for selectively energizing the stator.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNETIC REPULSION SUPPORTED RING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to rotatable machinery components, and more particularly to a magnetically supported ring or bearing utilizing magnetic repulsion between rotating and nonrotating parts to increase load capacity of the rotating part.

In conventional gas turbine engine structures, rotating components such as disks or rings must be configured and must include material to withstand centrifugal loading. A disk or ring component must support its self-induced centrifugal stress and that of the centrifugal load of the blades, which results in large disk or ring mass for a given combination of outer radius and rotational speed. Supporting material is therefore used inefficiently and is loaded in tension. Since many materials with high temperature capability and high potential specific strength, notably ceramics, perform better under compressive loading than under tensile loading, the conventional self-supporting disk or ring design does not allow full potential of the materials to be utilized.

According to the invention, centrifugal loads on a ring, disk or like rotatable part can be transferred to non-rotating static structure if tensile stresses in the part induced by centrifugal loading are reduced by radial repulsive forces, as by magnetic repulsion between the part and surrounding static structure. Magnetically compressed rotatable elements according to the invention may be applied to substantially any type of rotating components and assemblies in high-speed turbomachinery, such as turbine engines, pumps, compressors, motors, generators and centrifuges.

It is therefore a principal object of the invention to provide an improved support structure for rotating machinery parts.

It is a further object of the invention to provide a rotating ring, disk or bearing assembly having improved resistance to failure in tension under radial loads.

It is yet another object of the invention to provide magnetic support structure for rotating machinery parts.

It is yet another object of the invention to provide non-selfsupporting rotating turbomachinery parts by magnetically counteracting tensile stress in the parts caused by centrifugal loading.

These and other objects of the invention will become apparent as the detailed description of representative embodiments proceeds.

SUMMARY OF THE INVENTION

In accordance with the foregoing principles and objects of the invention, a magnetic support structure for a rotatable machinery part is described which comprises a stationary support structure, a stator comprising an annular array of a plurality of electromagnets or one or more electrically conductive or superconductive elements supported by the support structure about an axis, rim structure attached to the periphery of the rotatable part for rotation therewith about the axis radially inwardly of and proximate to the stator, the rim structure including electrically conductive non-ferromagnetic or superconductive material for magnetic interaction with the stator, and a source of power for selectively energizing the stator.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
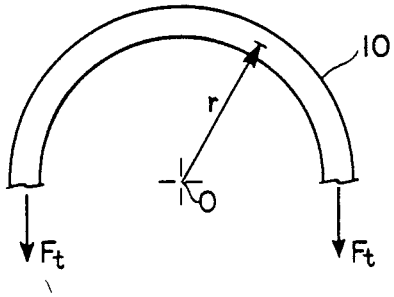
FIG. 1 shows a thin ring for illustration of the principles underlying operation of the invention.

An understanding of the invention will best be gained by consideration first of the underlying principles. Referring now to FIG 1, shown therein is a portion of thin ring 10 having rectangular cross section of preselected thickness and annular width. Consider ring 10 to have radius r and density $\rho$ and to rotate about axis O at angular velocity $\omega$. The magnitude of the tangential force $F_t$ acting on each end of the half ring caused by centrifugal force acting on ring 10 depends on r, $\omega$ and $\rho$. The corresponding tensile stress $\sigma$ in the ring is given by, $$\sigma = \rho r^2 \omega^2 \tag{1}$$

Available strength s' represents the ring material strength available for supporting external loads, such as centrifugal blade loads, and is defined as, $$s' = s - \sigma \tag{2}$$

where s is material strength.

A disk for a gas turbine engine compressor or turbine stage is usually designed to have the lowest practical average material radius, so that the useful load carrying ability of the disk is maximized. Alternatively, a ring configuration may be used if very high strength, low density material is available. In either case, much of the material strength is used to support the disk or ring against self induced centrifugal stress, leaving only a part of the material strength available for blade support. This is an inefficient use of material and results in relatively large mass of the disk or ring.

Figure 2:
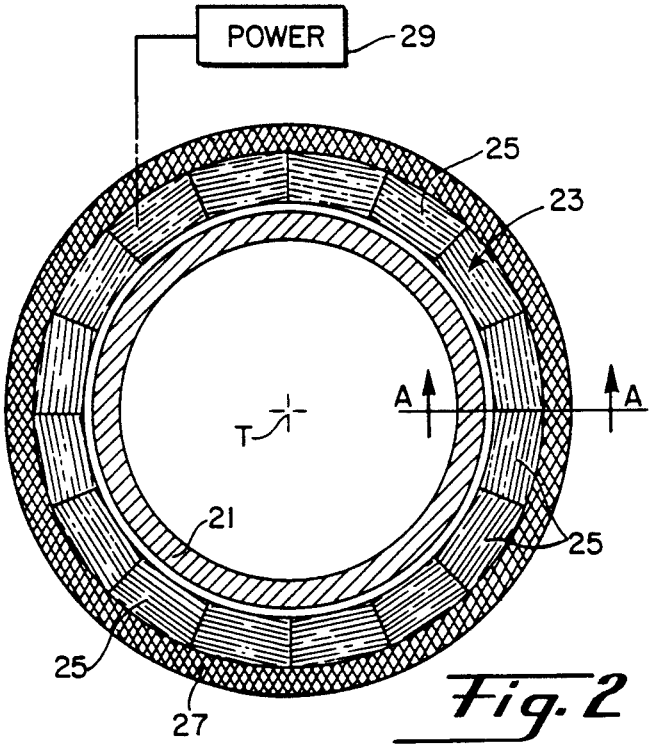
FIG. 2 shows in radial section a representative magnetic repulsion supported ring structure of the invention.

Referring now to FIG. 2, shown therein in radial section is a representative magnetic repulsion supported ring structure of the invention. It is noted at the outset that the invention may be applied to structures other than rings, such as rotatable disks, bearings and the like, the representative ring structure of FIG. 2 being exemplary of such structures. Ring 21 is usually thin in configuration similar to ring 10 of FIG. 1 and comprises electrically conductive and non-ferromagnetic material, such as aluminum, copper, graphite, molybdenum, titanium diboride and tungsten, or electrically superconductive material such as lanthanum-barium-copper oxide, niobium-tin, niobium-titanium, thallium-calcium-barium-copper oxide, and yttrium-barium-copper oxide. Ring 21 is supported for rotation about axis T within relatively stationary stator 23 comprising a plurality of individual electromagnets or one or more electrically conductive or superconductive elements 25. Stator 23 is supported by static structure or housing 27. A number of methods may be used to achieve compression of ring 21 by magnetic repulsion between ring 21 and stator 23. A description of three such methods follows.

Figure 3:
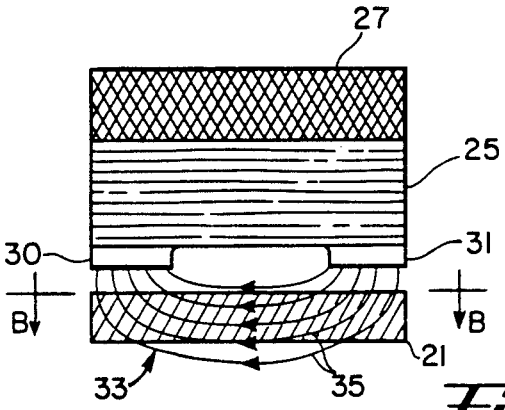
FIG. 3 is a view along line A—A of the structure of FIG. 2.
Figure 4:
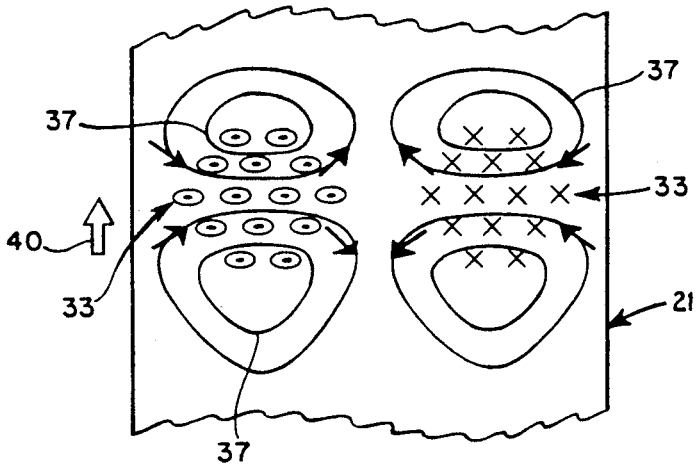
FIG. 4 is a view along line B—B of the structure of FIG. 3.

One method is referred to as magnetodynamic compression. Stator 23 is operatively connected to power source 29 supplying direct current to stator 23. Referring now to FIG. 3, shown therein is a view along line A—A of the structure of FIG 2. The direct current supplied to elements 25 produces between poles 30,31 of each element 25 a magnetic field 33 as suggested by flux lines 35. Since ring 21 is non-ferromagnetic it is not attracted to stator 23. Magnetic field 33, referred to as the primary field, penetrates ring 21. Rotation 40 of ring 21 through magnetic field 33 induces eddy currents 37 in ring 21 as suggested in FIG. 4. Each eddy current 37 produces in ring 21 a secondary magnetic field of the same polarity as primary magnetic field 33. Interaction between fields produces a net repulsive pressure between ring 21 and stator 23. The pressure supports ring 21 against centrifugal loading resulting from rotation 40 of ring 21 within stator 23 and housing 27, and results in a transfer of tensile stresses from ring 21 through the load path of magnetic field 33 and stator 23 to housing 27.

Another method is referred to as magnetostatic compression. Stator 23 is operatively connected to power source 29 supplying either alternating or pulsed current to stator 23. Referring now to FIG. 3, the alternating or pulsed current supplied to elements 25 produces at poles 30,31 of each element 25 a time varying magnetic field 33 as suggested by flux lines 35. Eddy current generation, magnetic repulsion between ring 21 and stator 23, and consequent magnetic compression of ring 21, occurs in a manner similar to that in magnetodynamic repulsion, except that eddy currents similar, but not identical, to eddy currents 37 are generated by the time varying primary magnetic field 33 with no rotation 40 of ring 21 being required.

Yet another method is referred to as Meissner compression. Stator 23 is operatively connected to power source 29 supplying direct current to stator 23. Ring 21 is electrically superconductive. The current supplied to stator 23 produces a magnetic field 33 as in magnetodynamic compression. In this case, the superconductive material of ring 21 excludes flex lines 35 of magnetic field 33 from penetrating ring 21. This is known as the Meissner effect. The result is a net repulsive force between ring 21 and stator 23, resulting in magnetic compression of ring 21.

Figure 5:
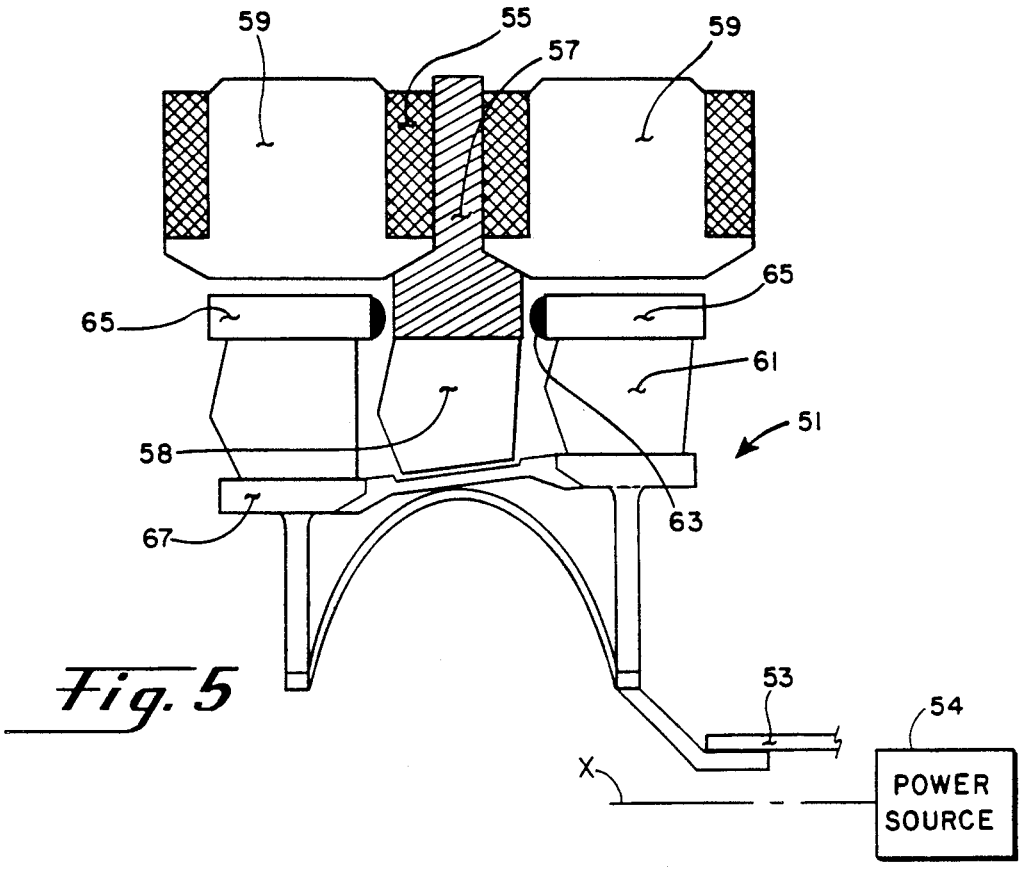
FIG. 5 is a fragmentary view in axial section of a representative magnetically compressed rotatable compressor blade structure of the invention.

Referring now to FIG. 5, shown therein is a fragmentary view in axial section of a representative magnetically compressed rotatable compressor blade structure configured according to the invention. A compressor blade, ring or other part 51 is mounted for rotation about axis X on shaft 53 driven by engine or other power source 54. Support structure for part 51 may include structural ring or housing 55 supporting annular stators 57 on which are mounted stator blades 58 in representative engine structure. In unconventional fashion, an annular array of a plurality of electromagnets 59 are supported by housing 55 near the periphery of part 51. In conventional fashion, part 51 may include a plurality of rotating (compressor or rotor) blades 61 and appropriate rotating seals 63 between part 51 and stator blades 58. On the periphery of each blade 61 is mounted induction ring 65 comprising non-ferromagnetic material of the type described above in relation to FIGS. 2–4 for interacting electromagnetically with electromagnets 59 in the functioning of the invention. In certain cases wherein blades 61 are of appropriate material, induction ring 65 may be an integral part of the corresponding blade 61. Torque ring 67 supports or forms an integral part of the radially inward end of blade 61 and serves to transfer work to blades 61 and transfers torque through blades 61 to induction ring 65. Torque ring 67 and the remaining part 51 structure disposed for rotation radially inwardly thereof is supported against centrifugal loading through blades 61 by induction ring 65. Torque ring 67 is structurally attached to shaft 53 of part 51. With the exception of seals, seal supports and shafting, all structure within induction ring 65 is loaded substantially in compression.

In the operation of the rotating machinery part structure of the invention, the induction ring (e.g. 21 or 61) is mounted for rotation near and within supporting stator structure (23 or 55) on which elements 25 or electromagnets 59 are disposed. As the machinery part is rotated, current is supplied to selectively energize the electromagnets to impart magnetic compression to the rotating part to maintain tensile stresses in the rotating part within allowable limits. The amount of current applied to the electromagnets may be controlled according to a predetermined scheme of magnetic compression requirements for the rotating part as a function of rotational speed and, accordingly, at shutdown, current may be decreased to accommodate decreasing rotational speed of the rotating part. Power failure at high rotational speeds may result in damage to the rotating part, and an auxiliary direct current source may be included to maintain magnetic pressure on the rotating part and act as a magnetic brake in slowing the part to safe speeds or to a stop.

The structure of the invention has certain advantages over corresponding prior art structures. Since the supporting structure (e.g. housing 27 of FIG. 2) supports only the mass of the rotating part 51 against centrifugal loading, and not its own mass, an increase in structural efficiency over the prior art structures is realized. Overall reduction of turbine engine stage weight may be realized if mass reduction realized from increased structural efficiency exceeds the added mass of the stator and power supply. Material located inside the induction ring is generally in compression which allows the full potential strength of materials such as ceramics to be utilized. Since the blades (e.g. 61 of FIG. 5) are in compression, structural integrity of the rotating machinery part is improved against failure resulting from foreign object damage or vibration, and the induction ring, stator and housing structure provide containment. In prior art structures failure of a turbine disk is highly destructive and may be uncontainable because of the large mass and high energy content of the disk. Failure of an induction ring in the structure of the invention is, however, substantially more containable because of the considerably lower mass and energy content of the ring compared to a turbine disk.

The invention therefore provides a novel magnetic support structure for a rotating machinery part. It is understood that modifications to the invention as described may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. Magnetic support structure for a rotatable machinery part comprising:

(a) stationary support structure;

(b) an annular stator comprising a plurality of individual electrically conductive elements supported by said support structure and circumferentially disposed in said annular stator about an axis of rotation for said rotatable machinery part;

(c) means for supporting said rotatable machinery part for rotation about said axis within said stator;

(d) rim structure attached to the periphery of said rotatable machinery part for rotation therewith about said axis and disposed radially inwardly of and proximate to said stator;

(e) said rim structure including electrically conductive non-ferromagnetic material for magnetic interaction with said conductive elements of said stator to provide a radially inwardly directed force on said rotatable machinery part; and (f) a source of power operatively attached to said stator for selectively energizing said conductive elements of said stator.

2. The structure as recited in claim 1 wherein said electrically conductive non-ferromagnetic material is selected from the group consisting of aluminum, copper, graphite, molybdenum, titanium diboride, tungsten, lanthanum-barium-copper oxide, niobium-tin, niobium-titanium, thallium-calcium-barium-copper oxide, and yttrium-barium-copper oxide.

* * * * *